(12) United States Patent
Chen et al.

(10) Patent No.: US 8,427,529 B2
(45) Date of Patent: Apr. 23, 2013

(54) THREE-DIMENSIONAL DISPLAY, FABRICATING METHOD AND CONTROLLING METHOD THEREOF

(75) Inventors: Chao-Yuan Chen, Hsinchu County (TW); Chih-Wen Chen, Tainan (TW); Geng-Yu Liu, Miaoli County (TW); Wan-Hua Lu, Hsinchu (TW); Ting-Jui Chang, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 1152 days.

(21) Appl. No.: 12/272,692

(22) Filed: Nov. 17, 2008

(65) Prior Publication Data

US 2010/0060721 A1  Mar. 11, 2010

(30) Foreign Application Priority Data

Sep. 5, 2008 (TW) .............................. 97134206 A

(51) Int. Cl.
*H04N 15/00* (2006.01)
*H04N 13/02* (2006.01)
*H04N 13/04* (2006.01)

(52) U.S. Cl.
USPC ................................ 348/51; 348/53; 348/57

(58) Field of Classification Search ........................ None
See application file for complete search history.

(56) References Cited

U.S. PATENT DOCUMENTS

| 6,157,424 | A | 12/2000 | Eichenlaub |
| 6,400,394 | B1 * | 6/2002 | Kim et al. ........................ 348/51 |
| 8,044,879 | B2 * | 10/2011 | Matveev et al. .................. 345/4 |
| 2009/0310044 | A1 * | 12/2009 | Lee ................................ 349/15 |

FOREIGN PATENT DOCUMENTS

| CN | 1543735 | 11/2004 |
| CN | 101183177 | 5/2008 |
| TW | 452303 | 8/2001 |
| TW | I264600 | 10/2006 |
| TW | I276836 | 3/2007 |
| TW | 200717043 | 5/2007 |
| WO | 2007008777 | 1/2007 |

OTHER PUBLICATIONS

"1st Office Action of China counterpart application", issued on Aug. 21, 2009, p. 1-7.
"Office Action of Taiwan Counterpart Application", issued on Nov. 30, 2012, p. 1-8, in which the listed reference was cited.

* cited by examiner

*Primary Examiner* — Mohamed Ibrahim
(74) *Attorney, Agent, or Firm* — Jianq Chyun IP Office

(57) ABSTRACT

A three-dimensional display for the viewer to watch through glasses is provided, wherein the glasses have two lenses and the polarized directions thereof are perpendicular to each other. The three-dimensional display includes a display panel and a liquid crystal phase modulator. The display panel, suitable for displaying an image, has a plurality of pixels arranged in array and a polarizer having a transmission axis, wherein the polarizer disposed between the pixels and the glasses. The liquid crystal phase modulator suitable for providing phase retardation includes a liquid crystal layer and an alignment layer adjacent to the display panel. An included angle between an alignment direction of the alignment layer and the transmission axis is substantially equal to n×45 degrees, wherein an absolute value of n is an integer. The liquid crystal phase modulator adjusts a phase of the image and then outputs an image with three-dimensional information.

11 Claims, 9 Drawing Sheets

THREE-DIMENSIONAL DISPLAY, FABRICATING METHOD AND CONTROLLING METHOD THEREOF

CROSS-REFERENCE TO RELATED APPLICATION

This application claims the priority benefit of Taiwan application serial no. 97134206, filed on Sep. 5, 2008. The entirety of the above-mentioned patent application is hereby incorporated by reference herein and made a part of this specification.

BACKGROUND OF THE INVENTION

1. Field of the Invention

The present invention relates to a display, a fabricating method, and a controlling method thereof, and particularly relates to a three-dimensional display suitable for providing corresponding phase retardation to a display panel, a fabricating method, and a controlling method thereof.

2. Description of Related Art

As technology advances and develops, people's eagerness for better material life and spiritual life are increasing without a pause. When it comes to the spiritual life, in the world of technology, most people have the desire to realize their imagination and to experience it vividly with the help of various display devices. For this reason, how to develop display devices suitable for displaying three-dimensional images has become the goal to the manufacturers in the field.

In view of the appearance, the technology of three-dimensional display may be roughly categorized into two types. One is stereoscopic type which requires a viewer to wear specially designed glasses and the other is auto-stereoscopic type which allows the viewer to see directly with naked eyes. Three-dimensional display of the stereoscopic type may be realized by using color filter glasses, polarized glasses, shutter glasses, and so forth. Three-dimensional display of the stereoscopic type mainly functions by using a display to send images with special information to the left and right eyes of the viewer. Through wearing glasses, the left and right eyes of the viewer may see different images, which are combined to form a three-dimensional image.

FIG. 1 is a schematic view illustrating a display mechanism of a three-dimensional display used with polarized glasses. Referring to FIG. 1, a three-dimensional display 100 is provided for the viewer to watch through polarized glasses 110. The polarized glasses 110 include two linear polarized lenses respectively having polarized directions D1 and D2. The three-dimensional display 100 includes a single display panel 120 and a patterned half-wave plate 130 arranged between the display panel 120 and the polarized glasses 110. As shown in FIG. 1, the display panel 120 has a plurality of pixels arranged in array, and the pixels in odd rows and even rows separately present a right-eye image R and a left-eye image L, as the image F1 in FIG. 1. In addition, the display panel 120 has a polarizer 140. An extending direction of a light axis of the polarizer 140 is parallel to the polarized direction D1, so as to make the display panel 120 suitable for displaying a linear polarized image of the polarized direction D1. The patterned half-wave plate 130 includes a plurality of strip patterns B, and each of the strip patterns B is adapted for providing a phase retardation which transfers the linear polarized image of the polarized direction D1 to a linear polarized image of the polarized direction D2. Each of the strip patterns B respectively corresponds to one row of the pixels in the odd rows, so that the pixels in the odd rows may present a linear polarized right-eye image R of the polarized direction D2 through the strip patterns B, as the image F2 in FIG. 1. When the viewer watches the three-dimensional display 100 through the polarized glasses 110, the linear polarized lenses of different polarizing properties allow the left and right eyes of the viewer to respectively see the left-eye image L of the polarized direction D1 and the right-eye image R of the polarized direction D2, which form the three-dimensional image.

It is noted that three-dimensional displays may also be categorized into a time-multiplexed type and a spatial-multiplexed type according to the display mechanisms thereof. Herein, the time-multiplexed type mainly applies specially designed light-splitting mechanism to continuously sending left-eye and right-eye images to the left eye and right eye of the viewer, so as to achieve three-dimensional effect. However, the time-multiplexed type usually causes flicker phenomenon to the display images.

The spatial-multiplexed type divides display images into alternate display areas for left-eye images and right-eye images, as the three-dimensional display in FIG. 1, and sends the images to the left eye and the right eye respectively, so as to achieve three-dimensional effect. Although the use of the spatial-multiplexed type may prevent the flicker phenomenon, the resolution of the three-dimensional images seen by the viewer wearing polarized glasses is 50% reduced, which affects the display quality. Hence, how to maintain resolution without causing flicker phenomenon has become a focus in developing three-dimensional displays.

SUMMARY OF THE INVENTION

The present invention provides a three-dimensional display for maintaining the resolution of a three-dimensional image and preventing a flicker phenomenon.

The present invention provides a fabricating method of a three-dimensional display, in which a liquid crystal phase modulator is formed on a display panel to provide a phase retardation which allows the left and right eyes of a viewer to respectively see individual images when wearing glasses.

The present invention provides a controlling method of a three-dimensional display for maintaining the resolution of a three-dimensional image and preventing the flicker phenomenon.

The present invention provides a three-dimensional display for a viewer to see images through glasses with two lenses having polarized directions perpendicular to each other, and the three-dimensional display includes a display panel and a liquid crystal phase modulator. The display panel includes a plurality of pixels arranged in array and a polarizer, wherein the polarizer is disposed between the pixels and the glasses and has a transmission axis, and the display panel is suitable for displaying an image. The liquid crystal phase modulator is disposed between the display panel and the glasses and includes a liquid crystal layer and an alignment layer adjacent to the display panel, wherein an included angle between an alignment direction of the alignment layer and the transmission axis is substantially equal to n×45 degrees, an absolute value of n is an integer, the liquid crystal phase modulator is suitable for providing a phase retardation, the liquid crystal phase modulator adjusts a phase of the image to output an image with three-dimensional information, and the liquid crystal phase modulator includes no polarizer.

The present invention provides a fabricating method of a three-dimensional display, and the fabricating method comprises the following steps. First, a display panel including a plurality of pixels arranged in array and a polarizer is provided. The polarizer has a transmission axis and the display panel is suitable for displaying an image. Then, a liquid crystal phase modulator disposed on the display panel is provided. The liquid crystal phase modulator is arranged between the polarizer and the glasses and includes a liquid crystal layer and an alignment layer adjacent to the display panel, wherein an included angle between an alignment direction of the alignment layer and the transmission axis is substantially equal to n×45 degrees, an absolute value of n is an integer, the liquid crystal phase modulator is suitable for providing a phase retardation, the liquid crystal phase modulator adjusts a phase of the image to output an image with three-dimensional information, and the liquid crystal phase modulator includes no polarizer.

The present invention provides a controlling method of a three-dimensional display for a viewer to see a three-dimensional image through glasses, wherein the glasses have two circular polarized lenses of different polarization properties. The controlling method comprises the following steps. First, a display panel having a plurality of pixels arranged in array and a polarizer disposed between the pixels and the glasses is provided. The polarizer has a transmission axis and the display panel is suitable for displaying an image. Then, a liquid crystal phase modulator disposed between the display panel and the glasses is provided. The liquid crystal phase modulator includes a liquid crystal layer and an alignment layer adjacent to the display panel. An included angle between an alignment direction of the alignment layer and the transmission axis is substantially equal to n×45 degrees and an absolute value of n is an integer. Thereafter, the liquid crystal phase modulator is driven to provide a phase retardation according to the image displayed by the display panel. The liquid crystal phase modulator adjusts a phase of the image to output an image with three-dimensional information, and the liquid crystal phase modulator includes no polarizer.

Based on the above, the three-dimensional display of the present invention includes a display panel for displaying images, and the display panel is capable of controlling the brightness of the images. Further, the three-dimensional display includes a liquid crystal phase modulator for controlling the phase retardations of the images displayed by the display panel, so that the phase retardations provided by the liquid crystal phase modulator may transform the images provided by the display panel into images with three-dimensional information. Thereby, the viewer is able to see three-dimensional images with original resolution when watching the three-dimensional display through glasses with lenses having polarized directions perpendicular to each other. In some embodiments, the three-dimensional display further includes a quarter-wave plate, a half-wave plate, or a combination thereof. These phase retardation plates are able to increase the viewing angle of the three-dimensional display and further improve the display quality of images.

To make the above and other objectives, features, and advantages of the present invention more comprehensible, preferable embodiments accompanied with figures are detailed as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
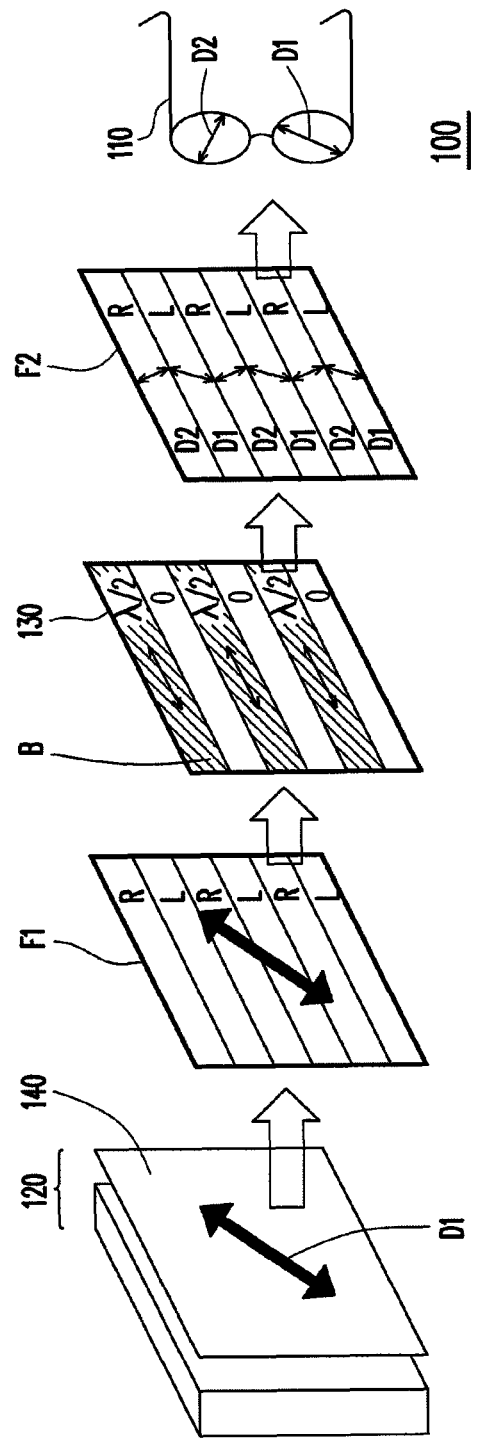
FIG. 1 is a schematic view illustrating a related display mechanism of a three-dimensional display used with polarized glasses.
Figure 2:
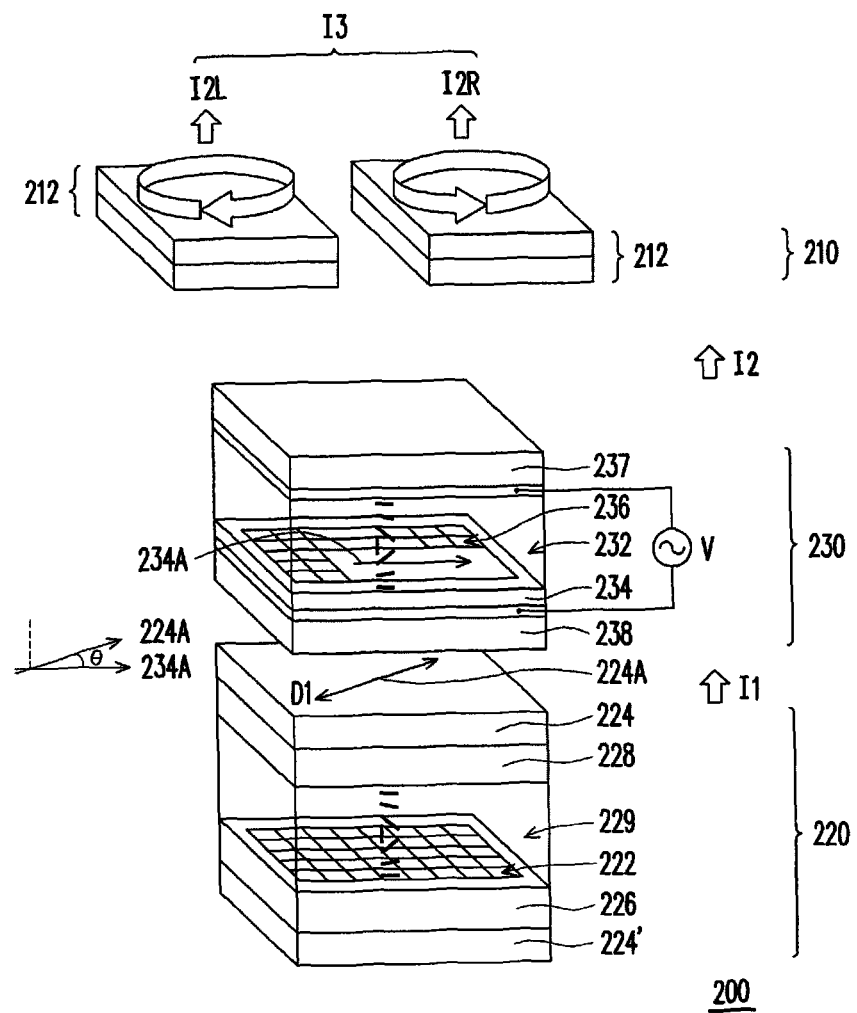
FIG. 2 is a schematic view illustrating a three-dimensional display according to an embodiment of the present invention.

FIG. 2 is a schematic view illustrating a three-dimensional display according to an embodiment of the present invention. Referring to FIG. 2, a three-dimensional display 200 is adapted for a viewer to watch through glasses 210, wherein the glasses 210 comprise two lenses 212 having polarized directions perpendicular to each other, so as to form two polarized lights having polarized directions perpendicular to each other after a light passes through the lenses 212. For instance, the glasses 210 may comprise two circular polarized lenses 212 having different polarized directions. Light is converted into a levorotary polarized light and a dextrorotary polarized light after passing through the lenses 212. Moreover, the three-dimensional display 200 comprises a display panel 220 and a liquid crystal phase modulator 230. The display panel 220 has a plurality of pixels 222 arranged in array and a polarizer 224, wherein each of the pixels 222 comprises at least a signal line (not shown), at least an active device (not shown) electrically connected to the signal line, and at least a capacitance (not shown) electrically connected to the active device. The signal line comprises a scan line (not shown) and a data line (not shown). The polarizer 224 is disposed between the pixels 222 and the glasses 210, and includes a transmission axis 224A having an extending direction D1 so that a polarized direction of the light passing through the polarizer 224 inclines to the transmission axis 224A. In addition, the display panel 220 is adapted for display an image I1. Preferably, the information included in the image I1 for the left and right eyes is substantially different in proportion, but the present invention is not limited thereto. As shown in FIG. 2, in this embodiment, preferably the display panel 220 may selectively comprise another polarizer 224' disposed away from the liquid crystal phase modulator 230. (Further, the liquid crystal phase modulator 230 is arranged between the display panel 220 and the glasses 210.

Referring to FIG. 2, the display panel 220 has a plurality of pixels 222 arranged in array, wherein the brightness of the pixels 222 may be respectively controlled by inputting different data voltages, so as to present the image I1. In this embodiment, the image I1 displayed by the display panel 220 is, for example, a linear polarized image, but the present invention is not limited thereto. Specifically, the polarizer 224 arranged between the liquid crystal phase modulator 230 and the pixels 222 comprises the transmission axis 224A having the extending direction D1. In this embodiment, the polarized direction of the image I1 displayed by the pixels inclines to the transmission axis 224A after the image I1 passes through the polarizer 224, such that the display panel 220 is able to display a linear polarized image I1 having the polarized direction D1. Moreover, as shown in FIG. 2, in this embodiment, the pixels 222 in the display panel 220 are, for example, formed by an active device array substrate 226, a color filter substrate 228, and a liquid crystal layer 229 dispose therebetween, but the present invention is not limited thereto. Other suitable display panels may also be adopted. In other embodiments, a color filter layer (not shown) in the color filter substrate 228 may also be disposed on the active device array substrate 226.

Referring to FIG. 2, the liquid crystal phase modulator 230 comprises a liquid crystal layer 232 and an alignment layer 234 adjacent to the display panel 220, wherein an included angle θ between an alignment direction 234A of the alignment layer 234 and the transmission axis 224A is substantially equal to n×45 degrees, and an absolute value of n is an integer. Preferably, n represents the absolute value larger than 0. For example, the included angle θ between the alignment direction 234A of the alignment layer 234 and the transmission axis 224A may be substantially equal to 45 degrees, 90 degrees, 135 degrees, 180 degrees, 225 degrees, 270 degrees, 315 degrees, or other suitable degrees complying with this rule, wherein the included angle θ is preferably larger than 45 degrees, 135 degrees, or 225 degrees, i.e. 45 degrees+m×90 degrees. An absolute value of m is an integer, but the present invention is not limited thereto. It is noted that, when the included angle θ between the alignment direction 234A of the alignment layer 234 and the transmission axis 224A is substantially equal to 45 degrees, 135 degrees, or larger than 225 degrees, the light passing through the alignment layer 234 and the transmission axis 224A may be transferred into the a levorotary circular polarized light and a dextrorotary circular polarized light for further enhancing the optical effects of the three-dimensional display 200.

It is noted that, the three-dimensional display 200 of the present invention adjusts the phase of the image I1 by using the liquid crystal phase modulator 230 and outputs an image I2 with three-dimensional information. Hence, the viewer may see a three-dimensional image I3 having the same resolution as the display panel 220 through the glasses 210. To be more detailed, in this embodiment, the liquid crystal phase modulator 230 may be divided into a plurality of modulation areas 236 corresponding to the pixels 222 of the display panel 220. Each of the modulation areas 236 is capable of changing the phase of the image I1 displayed by the corresponding pixels 222 and transferring the image I1 into the image I2 with three-dimensional information, so that the left and right eyes of the viewer may see the three-dimensional image I3 when wearing the lenses 212 having different polarized directions. Specifically, the image I2 with three-dimensional information is formed while the phases of the image I1 displayed by pixels 222 are respectively changed by the corresponding modulation areas 236. The left and right eyes of the viewer may separately see two individual images I2R and I2L which form the three-dimensional image I3 after the image I2 with three-dimensional information passes through the lenses 212 having different polarized directions. Because the image I2 displayed by pixels is respectively recognized as the left-eye image I2L and the right-eye image I2R by the viewer's left and right eyes, the resolution of the three-dimensional image I3 displayed from the three-dimensional display 200 of the present invention is not reduced.

It is noted that, the modulation areas 236 in the liquid crystal phase modulator 230 may have the same phase retardation. Certainly, the modulation areas 230 may also have different phase retardations according to the displaying effects to be brought by the three-dimensional image I3, but the present invention is not limited thereto.

Additionally, the components forming the liquid crystal phase modulator 230 may be the same as those forming the display panel 220. The liquid crystal phase modulator 230 does not comprise any polarizer 224, but comprises the liquid crystal layer. In this embodiment, the liquid crystal phase modulator 230 is mainly formed by the liquid crystal layer 232, at least one alignment layer 234, and two substrates 237 and 238 which respectively have an electrode and are disposed on two sides of the liquid crystal layer 232, wherein the electrodes on the substrates 237 and 238 may be respectively formed by a common electrode (not shown) and a pixel electrode (not shown) electrically connected with a corresponding active device, but the present invention is not limited thereto. Herein, at least one alignment layer 234 is, for example, disposed on the substrate 238. In other embodiments, the at least one alignment layer 234 may be disposed on the substrate 237 or simultaneously disposed on the substrates 237 and 238. It needs to be explained that, preferably, the liquid crystal phase modulator 230 does not comprise any color filter layer (not shown) disposed on one of the substrates 237 and 238, so as to prevent a light flux which reaches the glasses 210 from reducing. However, in other embodiments, the color filter layer (not shown) may also be disposed on one of the substrates 237 and 238, so as to avoid complicating the production line, while the light flux reaching the glasses 210 is enough and has no influence on the viewer.

Figure 3:
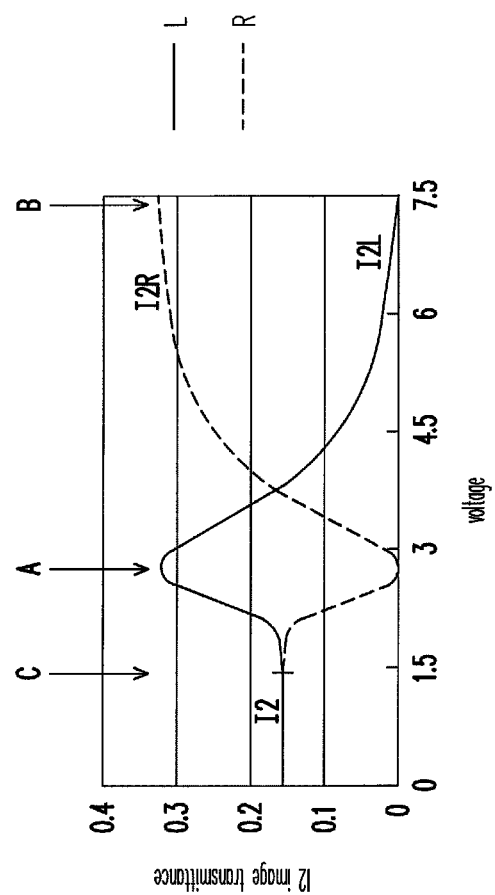
FIG. 3 illustrates a relationship between a voltage and an image transmittance of a liquid crystal phase modulator.
Figure 4A:
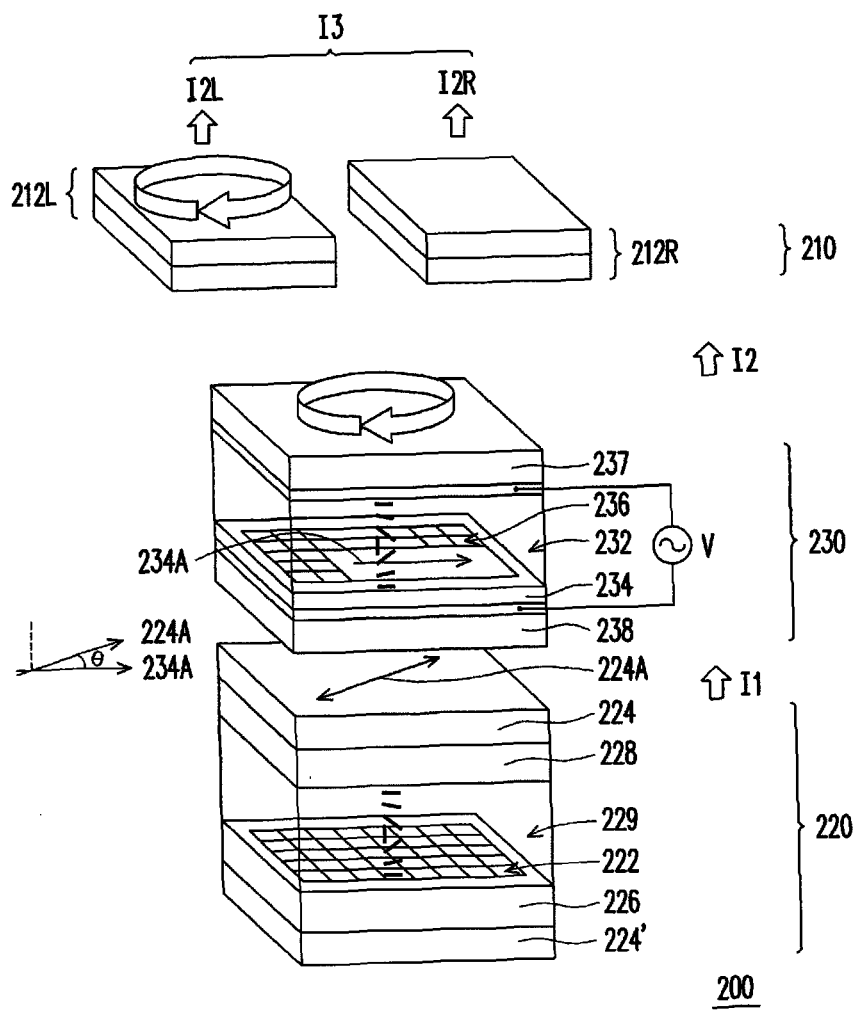
FIGS. 4A and 4B are schematic views respectively illustrating the display mechanisms of different voltage operation areas in FIG. 3.
Figure 4B:
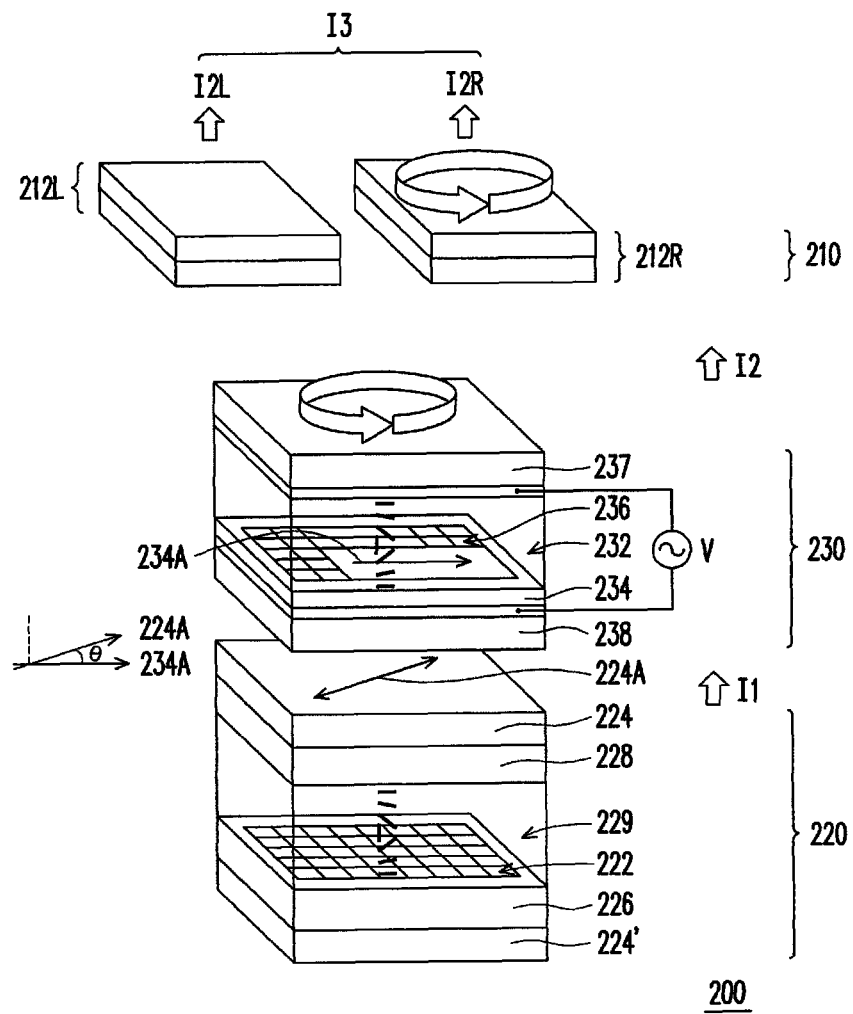

To be more specific, when a voltage difference V is applied to the two electrodes on two sides of the liquid crystal layer 229, the liquid crystal molecules in the liquid crystal layer 232 rotate to different degrees according to the corresponding voltage difference V applied in modulation areas 236. Further, because of an optical anisotropic property of the liquid crystal molecules, the liquid crystal phase modulator 230 may control the phase of the light passing therethrough based on the rotation degrees of the liquid crystal molecules. The rotation degrees of the liquid crystal molecules in the liquid crystal layer 232 are illustrated in FIGS. 3, 4A, and 4B. In other words, the image I1 displayed by the display panel 220 is transferred into the image I2 with three-dimensional information after the phase thereof is adjusted by the liquid crystal phase modulator 230. When watching the image I2 with three-dimensional information through the two lenses 212 having different polarized directions, the left and right eyes of the viewer may respectively see the left-eye image I2L and the right-eye image I2R which have different polarized directions.

To explain how the viewer sees the three-dimensional image I3 through the glasses 210 based on the image I2 with three-dimensional information provided by the liquid crystal phase modulator 230, a phase modulation mechanism of the liquid crystal phase modulator 230 and the glasses 210 is described as follows.

FIG. 3 illustrates a relationship between a voltage and an image transmittance of the liquid crystal phase modulator, and FIGS. 4A and 4B are schematic views respectively illustrating the display mechanisms of different voltage operation areas in FIG. 3, wherein an image transmittance curve L and an image transmittance curve R respectively represent the transmittances measured at the two lenses 212 having different polarized directions. The descriptions of other relevant components may be referred to in FIG. 2 and therefore not repeated here. Referring to FIGS. 3, 4A, and 4B, in this embodiment, the image I1 displayed by the display panel 220 is, for example, a linear polarized image, and the phase retardation provided by the liquid crystal phase modulator 230 in each modulation areas 236 may transfer the linear polarized image of each pixel 222 into each image I2 having three-dimensional information before the linear polarized image passes through the two lenses 212. In this embodiment, the lenses 212 before the left and right eyes of the viewer are, for example, a levorotary circular polarized lens 212L and a dextrorotary circular polarized lens 212R. As shown in FIG. 3, the proportion of the brightness of the image I2 projected to the left and right eyes of the viewer may be controlled by adjusting the voltage of each modulation area 236.

More specifically, referring to FIGS. 3 and 4A, when the voltage difference V applied to two sides of the liquid crystal layer 232 in the liquid crystal phase modulator 230 is adjusted to A region, the phase retardation provided by the liquid crystal phase modulator 230 is, for example, λ/4 which transfers the image I1 into an image I2 having three-dimensional information and a levorotary polarized direction after the image I1 passes through the liquid crystal phase modulator 230, as shown in FIG. 4. Because the levorotary circular polarized image may only pass the levorotary circular polarized lens 212L but not the dextrorotary circular polarized lens 212R, the image seen by the left eye of the viewer wearing the glasses 210 is the image I2L. The image I2L has the whole brightness of the image I2 emitted from the liquid crystal phase modulator 230 but the right eye is not able to see the image of this area.

On the other hand, referring to FIGS. 3 and 4B, when the voltage difference V applied to two sides of the liquid crystal layer 232 in the liquid crystal phase modulator 230 is adjusted to B region, the phase retardation provided by the liquid crystal phase modulator 230 becomes 3λ/4, which transfers the image I1 into an image I2 having three-dimensional information and a dextrorotary polarized direction after the image I1 passes through the liquid crystal phase modulator 230, as shown in FIG. 4B. Because the dextrorotary circular polarized image I2R may only pass the dextrorotary circular polarized lens 212R but not the levorotary circular polarized lens 212L, the image seen by the right eye of the viewer wearing the glasses 210 is the image I2R. Therefore, the image I2R has the whole brightness of the image I2 projected from the liquid crystal phase modulator 230 but the left eye is not able to see the image of this area.

Based on the above, the phase retardation of the display area may be varied at will by controlling the voltage of the liquid crystal phase modulator 230 to be any voltage between A region and B region or any voltage between A region and C region. Thereby, the viewer may see different individual images I2L and I2R in the same display area, as shown in FIG. 2. That is to say, when the image I1 displayed by the display panel 220 is a linear polarized image, a maximum phase retardation $(\Delta nd)_{max}$ provided by the liquid crystal layer 232 in the liquid crystal phase modulator 230 satisfies the following formula: $(\Delta nd)_{max} \geq 3\lambda/4$, wherein Δn represents an absolute value of a refractive index of the liquid crystal, d represents a thickness of the liquid crystal layer 232, and λ represents a wavelength. Accordingly, the linear polarized image displayed by the display panel 220 may be transferred into a circular polarized image via the liquid crystal phase modulator 230. Moreover, through controlling the voltage difference V applied to the two sides of the liquid crystal layer 232 in the liquid crystal phase modulator 230, the phase of the image I1 displayed by each pixel 222 may be continuously changed at will, such that the left and right eyes of the viewer may respectively see individual images I2R and I2L of different phases through the differently polarized lenses 212.

As a whole, the present invention provides a method for controlling a three-dimensional display, which comprises the following steps. First, a display panel 220 displaying an image I is provided. The components of the display panel 220 have been described in the above paragraphs. Then, a liquid crystal phase modulator 230 comprising the components illustrated in FIG. 2 is provided between the display panel 220 and the glasses 210. Thereafter, the liquid crystal phase modulator 230 is driven to provide a phase retardation based on the image I1 displayed by the display panel 220. More specifically, as shown in FIG. 3, the voltage applied to the liquid crystal layer 229 in the liquid crystal phase modulator 230 is controlled within a specific range (A region to C region or A region to B region in FIG. 3) according to the types of the liquid crystals and the thickness of the liquid crystal layer 229, so that the liquid crystal phase modulator 230 may provide different phase retardations corresponding to the pixels 222. Consequently, the phase of the image I1 displayed by the display panel 220 can be adjusted to output the image I2 with three-dimensional information. In this embodiment, if the viewer wants to see two-dimensional images without wearing the glasses 210, the operation of the liquid crystal phase modulator 230, i.e. inputting voltage or not inputting any voltage, would be based on the two-dimensional information provided by the display panel 220. Thereby, the viewer may see two-dimensional images. In other words, the above process is not influenced by the information proportion which the liquid crystal phase modulator 230 distributes to the left eye and right eye. Provided that the viewer wants to see two-dimensional images when wearing the glasses 210, the information, such as phase retardation, which the liquid crystal phase modulator 230 distributes to the left and right eyes of the viewer needs to be substantially equal in proportion. That is to say, the viewer may see the two-dimensional images of the display panel 230 when the information provided by the display panel 220 is substantially equal in proportion. More specifically, the information distributed by the liquid crystal phase modulator 230 is substantially equal in proportion, such that the information received by the left and right eyes of the viewer is substantially equal in proportion.

Certainly, the design of the liquid crystal layer 232 in the liquid crystal phase modulator 230 may be varied according to actual requirements of the display panel 220. In another embodiment, when the image I1 displayed by the display panel 220 is a circular polarized image, the maximum phase retardation $(\Delta nd)_{max}$, for example, satisfies the following formula: $(\Delta nd)_{max} \geq \lambda/2$, wherein Δn represents the absolute value of the refractive index of the liquid crystal, d represents the thickness of the liquid crystal layer 229, and λ represents the wavelength. That is to say, the thickness of the liquid crystal layer 232 may be varied when different types of liquid crystals are used. Referring to the above, the voltage applied to the liquid crystal phase modulator 230 may be operated within the range from A region to B region or the range from A region to C region, so as to change the phase of the image I1 displayed by each pixel 222. Thereby, the left and right eyes of the viewer may respectively see individual images of different phases through different polarized lenses 212.

Based on the above, the display panel 220 is used to control the intensity of the image I1 while the liquid crystal phase modulator 230 is mainly used to control the phase of the image I1 and output the image I2 with three-dimensional information. A combination of the above two functions helps the viewer to see the three-dimensional image I3 when watching the three-dimensional display through the glasses 210 with lenses 212 which have different polarized directions. Unlike the conventional technology which utilizes a time multiplexed method or a spatial multiplexed method, the three-dimensional display 200 of the present invention displays the three-dimensional image I3 mainly by modulating optical phases. Hence, when the viewer watches the three-dimensional display 200 through circular polarized lenses of different polarized directions, the resolution of the three-dimensional images is maintained and the conventional flicker problem is prevented to enhance the quality of the three-dimensional images.

Figure 5:
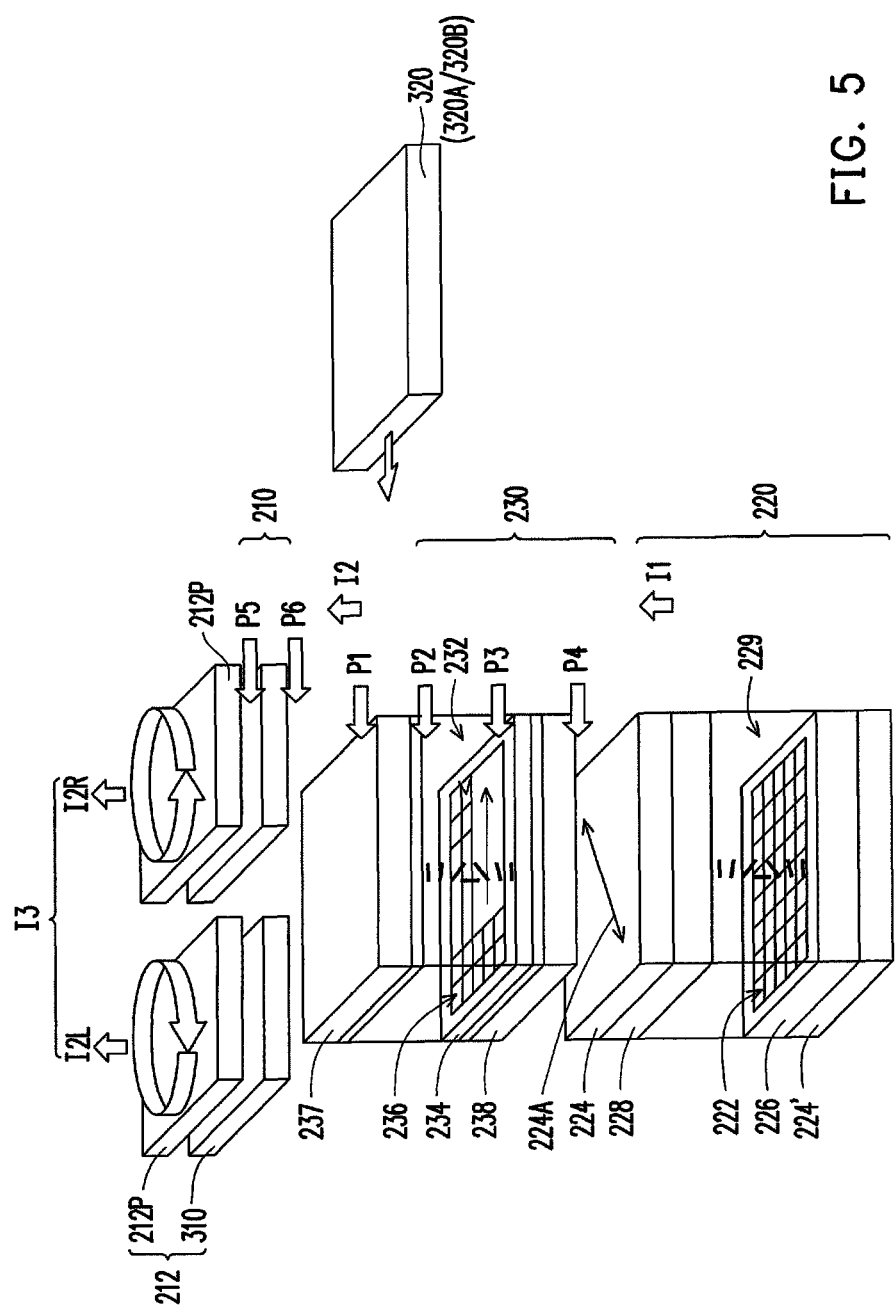
FIG. 5 is a schematic view illustrating a three-dimensional display according to an embodiment of the present invention.

To further improve the display effects of the three-dimensional display, optical films such as a half-wave plate or a quarter-wave plate may be disposed in proper positions inside the three-dimensional display for enhancing the optical property of the display and preventing color aberration of the three-dimensional image I3. To be more detailed, FIG. 5 is a schematic view illustrating a three-dimensional display according to an embodiment of the present invention, wherein the components as shown in FIG. 5 are similar to those in FIG. 2. Hence, the descriptions thereof are not repeated here. Referring to FIG. 5, the lenses 212 are, for example, circular polarized glasses which are mainly formed by a polarizer 212P and at least a quarter-wave plate 310. Further, the liquid crystal phase modulator 230 may also comprise at least a half-wave plate 320, wherein the at least one half-wave plate 320 may be disposed inside the liquid crystal phase modulator 230 to form at least an inner half-wave plate 320A. The at least one inner half-wave plate 320A may be selectively disposed in a position P2 and/or a position P3 in FIG. 5. Certainly, the liquid crystal phase modulator 230 may also comprise at least an outer half-wave plate 320B disposed on an outer surface of the liquid crystal phase modulator 230, wherein the at least one outer half-wave plate 320B may be selectively disposed in a position P1 and/or a position P4 in FIG. 5. The above combinations of optical films help to suppress the color aberration of the three-dimensional images I3.

Further, referring to FIG. 5, the lenses 212 may also be linear polarized lenses which are mainly formed by adding one half-wave plate 320 on the polarizer 224 and the quarter-wave plate 310. The polarized directions of the two lenses 212 are perpendicular to each other, wherein at least one half-wave plate 320 on the lenses 212 may be selectively disposed in a position P5, a position P6, or both in FIG. 5. However, the present invention is not limited thereto. When using this type of linear polarized glasses 210, the liquid crystal phase modulator 230 may be used with at least one of the inner half-wave plate 320A or the outer half-wave plate 320B, wherein at least one inner half-wave plate 320A is disposed inside the liquid crystal phase modulator 230 in the position P2 or the position P3 of FIG. 5, while at least one outer half-wave plate 320B is disposed on the outer surface of the liquid crystal phase modulator 230 in the position P1 or the position P4 of FIG. 5. In other words, at least one half-wave plate 320 may also be disposed in positions P2 and P1, positions P1 and P3, positions P4 and P3, or positions P4 and P2. In other embodiments, two or more than two half-wave plates 320 are simultaneously disposed in positions P1, P2, P3, or P4. That is to say, two or more than two half-wave plates are disposed on at least one of the liquid crystal phase modulator 230 and the glasses 210. Accordingly, the three-dimensional display may suppress color aberration when displaying the three-dimensional image I3.

Figure 6:
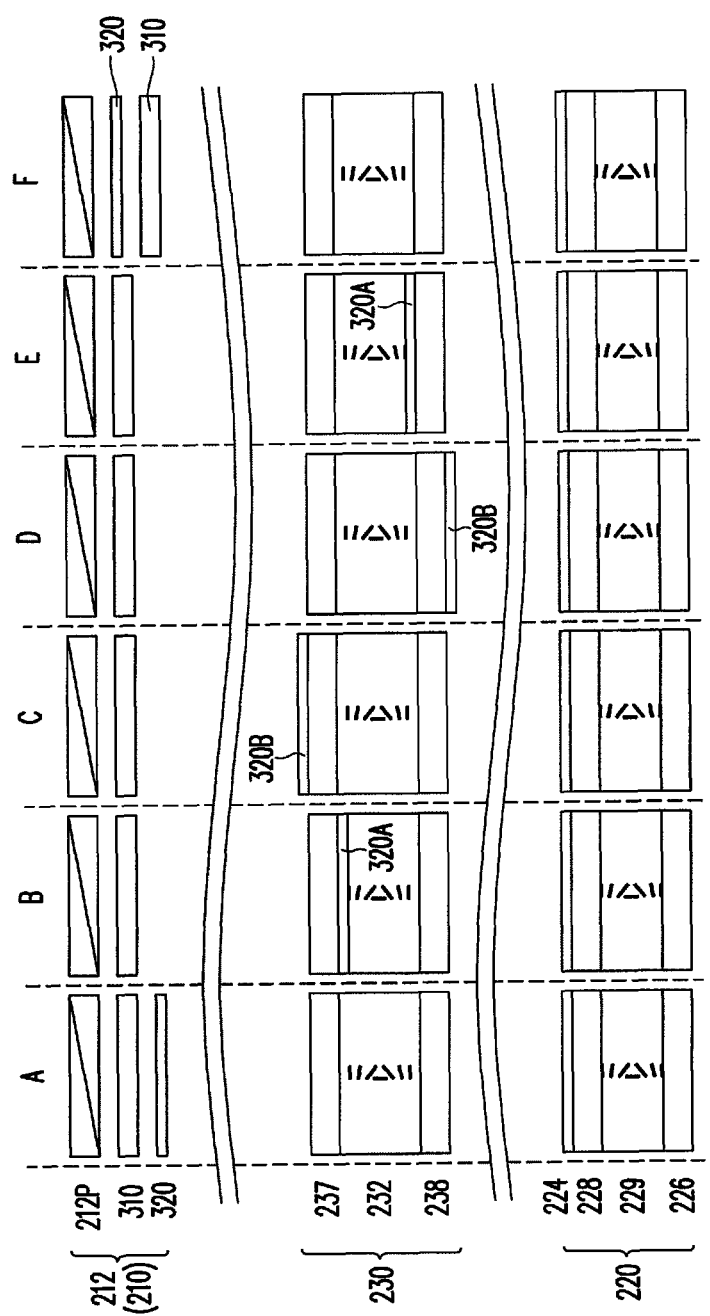
FIG. 6 illustrates various ways of arranging a phase difference plate on a liquid crystal phase modulator or glasses according to an embodiment of the present invention.

It is noted that the positions of the phase retardation plates such as the above-mentioned half-wave plate 320 and quarter-wave plate 310 may be varied at will. Specifically, FIG. 6 illustrates various ways of arranging phase retardation plates on the liquid crystal phase modulator or the glasses according to an embodiment of the present invention, wherein A, B, C, D, E, and F respectively illustrate different arrangements of the phase retardation plates. Moreover, in this embodiment, the phase retardation plates may be considered as one of the quarter-wave plate 310 and the half-wave plate 320 or any combination of the above. Referring to FIG. 6, in three-dimensional displays of Type A and Type F, the lenses 212 are combined with the quarter-wave plate 310 and the half-wave plate 320. However, the quarter-wave plate 310 and the half-wave plate 320 are disposed in different positions. In Type A, the quarter-wave plate 310 is arranged between the polarizer 212P of the lenses 212 and the half-wave plate 320, while in Type F, the half-wave plate 320 is disposed between the polarizer 212P of the lenses 212 and the quarter-wave plate 310. In three-dimensional displays of Type B and Type E, the lenses 212 only comprise the quarter-wave plate 310 disposed thereon, and the inner half-wave plate 320A is disposed inside the liquid crystal phase modulator 230. Further, the inner half-wave plate 320A is disposed in different positions in Type B and Type E. In Type B, the inner half-wave plate 320A is disposed between the substrate close to the glasses 210 and the liquid crystal layer 232, while in Type E, the inner half-wave plate 320A is disposed between the substrate close to the display panel 220 and the liquid crystal layer 232.

Referring to FIG. 6, in three-dimensional displays of Type C and Type D, the lenses 212 merely comprise the quarter-wave plate 310, and the outer half-wave plate 320B is disposed on the outer surface of the liquid crystal phase modulator 230. Further, the outer half-wave plate 320B is disposed in different positions in Type C and Type D. In Type C, the outer half-wave plate 320B is disposed on an outer surface of the substrate 237 close to the glasses 210, while in Type D, the outer half-wave plate 320B is disposed on an outer surface of the substrate 238 close to the display panel 220. Moreover, it needs to be clarified that, besides two half-wave plates and one quarter-wave plate, an additional quarter-wave plate may be added in the position illustrated in FIG. 6. That is to say, the use of two or more than two quarter-wave plates and two or more than two half-wave plates helps to further reduce color aberration. Therefore, two or more than two half-wave plates and two or more than two quarter-wave plates are disposed on at least one of the liquid crystal phase modulator 230 and the glasses 210.

The three-dimensional display 200 illustrated in FIG. 2 is taken as an example in the following paragraphs. A method for fabricating a three-dimensional display is further provided here. Please refer to FIG. 2 and FIGS. 7A-7B and the descriptions, wherein FIGS. 7A and 7B illustrate a process flow for fabricating a three-dimensional display of the present invention.

Figure 7A:
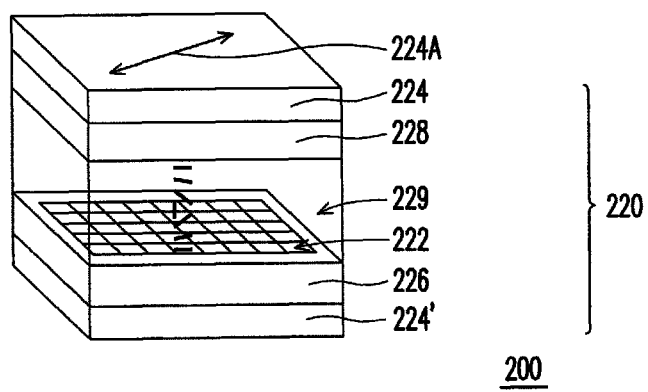
FIGS. 7A and 7B illustrate a process flow for fabricating a three-dimensional display of the present invention.

As shown in FIG. 7A, a display panel 220 including a plurality of pixels 222 arranged in array and the polarizer 224 is provided first. The polarizer 224 has the transmission axis 224A and the display panel 220 is suitable for displaying the image I1. For instance, the display panel 220 may be a liquid crystal display panel having the polarizer 224, an organic electro-luminescent display panel having the polarizer 224, or a plasma display panel or an electro-wetting display panel having the polarizer 224. In this embodiment, the liquid crystal display panel is taken as an example, wherein the liquid crystal display panel 220 is, for example, formed by an active device array substrate 226, a color filter substrate 228, and a liquid crystal layer 229 disposed therebetween.

Figure 7B:
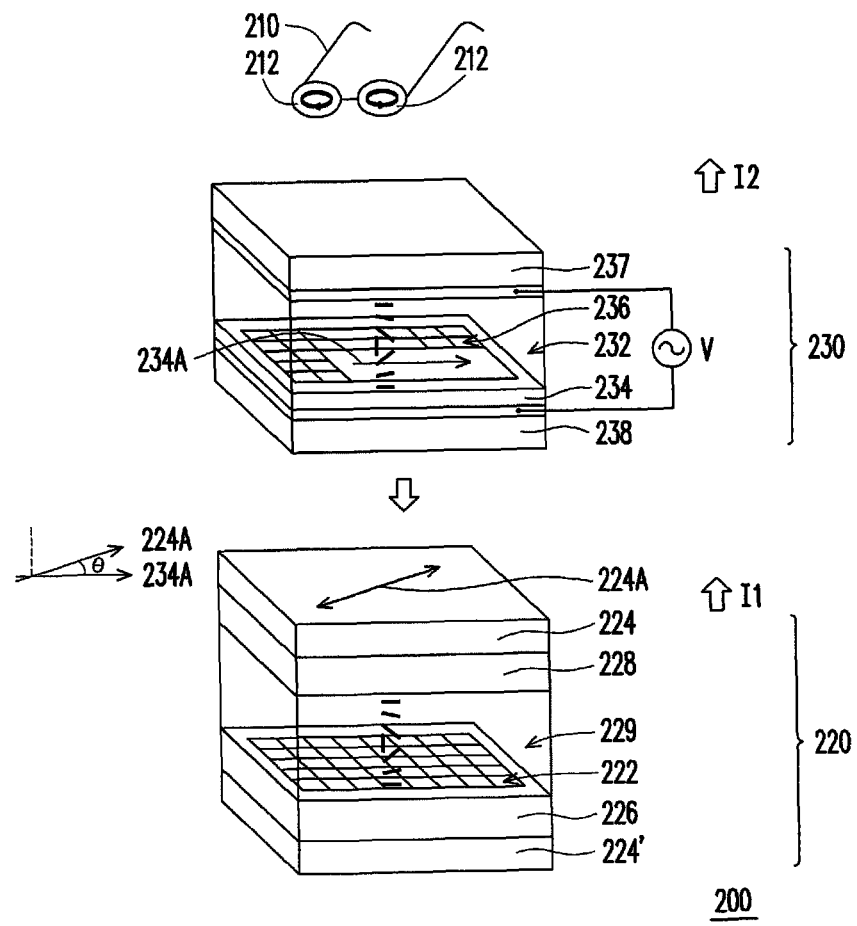

Then, referring to FIG. 7B, a liquid crystal phase modulator 230 disposed on the display panel 220 is provided, wherein the liquid crystal phase modulator 230 is arranged between the polarizer 224 and the glasses 210. The liquid crystal phase modulator 230 comprises the liquid crystal layer 232 and the alignment layer 234 adjacent to the display panel 220, wherein the included angle θ between the alignment direction 234A of the alignment layer 234 and the transmission axis 224A is substantially equal to n×45 degrees, and the absolute value of n is an integer. Preferably, n is an absolute value larger than 0. The liquid crystal phase modulator 230 is adapted for providing phase retardation, and the liquid crystal phase modulator 230 adjusts the phase of the image I1 to output the image I2 with three-dimensional information. Moreover, the liquid crystal phase modulator 230 does not comprise any polarizer. Accordingly, the fabrication of the three-dimensional display 200 is approximately completed. Then, the viewer is able to see the three-dimensional image I3 which has the same resolution as the display panel 220 when watching the three-dimensional display 200 through the glasses 210 with the lenses 212 having polarized directions perpendicular to each other. Additionally, the descriptions of the numbers and/or arrangements of other half-wave plates and/or quarter-wave plates may be found in the above paragraphs.

In view of the above embodiments, the display panel 220 and the phase modulator 230 are, for example, a liquid crystal display panel having the polarizer 224. To be more specific, the types of the liquid crystal display panel comprise a VA display panel, an IPS display panel, an MVA display panel, a TN display panel, a STN display panel, a PVA display panel, a S-PVA display panel, an ASV display panel, a FFS display panel, a CPA display panel, an ASM display panel, an OCB display panel, a S-IPS display panel, an AS-IPS display panel, an UFFS display panel, a PSA display panel, a dual-view display panel, and a triple-view display panel. Additionally, the phase modulator 230 is also applicable in the above-mentioned panels, but comprises no polarizer.

To conclude, the three-dimensional display, the fabricating method, and the controlling method of the present invention at least have all or a part of the following advantages:

1. The liquid crystal phase modulator of the present invention may provide different phase retardations in different areas. To the pixels of the display panel, the phase retardations provided by the liquid crystal phase modulator are continuously changeable, so as to allow the viewer to see three-dimensional images with the original resolution when wearing lenses having two polarized directions perpendicular to each other.
2. The three-dimensional display of the present invention achieves the purpose of displaying three-dimensional images mainly by changing optical phases. Therefore, the flicker phenomenon which occurs in the conventional time multiplexed method is prevented.
3. In some embodiments of the present invention, the three-dimensional display further comprises quarter-wave plates, half-wave plates, or a combination thereof. These phase retardation plates help to increase the optical property of the three-dimensional display and reduce color aberration to further improve the quality of three-dimensional images.

Although the present invention has been disclosed by the above embodiments, they are not intended to limit the present invention. Anybody with ordinary knowledge in the art may make some modifications and alterations without departing from the spirit and scope of the present invention. Therefore, the scope for which protection is sought by the present invention falls in the appended claims.

What is claimed is:

1. A three-dimensional display, adapted for a viewer to watch through glasses with two lenses having polarized directions perpendicular to each other, the three-dimensional display comprising:
    a display panel comprising a plurality of pixels arranged in array and a polarizer, wherein the polarizer being disposed between the pixels and the glasses and having a transmission axis, and the display panel is suitable for displaying an image; and
    a liquid crystal phase modulator disposed between the display panel and the glasses and comprising a liquid crystal layer and an alignment layer adjacent to the display panel, wherein an included angle between an alignment direction of the alignment layer and the transmission axis is substantially equal to n×45 degrees, an absolute value of n being an integer, the liquid crystal phase modulator is suitable for providing a phase retardation, the liquid crystal phase modulator adjusting a phase of the image to output an image with three-dimensional information, and the liquid crystal phase modulator comprising no polarizer.

2. The three-dimensional display as claimed in claim 1, wherein the display panel displays a linear polarized image.

3. The three-dimensional display as claimed in claim 2, wherein a maximum $(\Delta nd)_{max}$ of the phase retardation satisfies the following formula:
    $(\Delta nd)_{max} \geq 3\lambda/4$, wherein $\Delta n$ represents an absolute difference of refractive index of a liquid crystal, d represents a thickness of the liquid crystal layer, and $\lambda$ represents a wavelength.

4. The three-dimensional display as claimed in claim 1, wherein the display panel displays a circular polarized image.

5. The three-dimensional display as claimed in claim 4, wherein the maximum $(\Delta nd)_{max}$ of the phase retardation satisfies the following formula:
    $(\Delta nd)_{max} \geq \lambda/2$, wherein $\Delta n$ represents the absolute difference of the refractive index of the liquid crystal, d represents the thickness of the liquid crystal layer, and $\lambda$ represents the wavelength.

6. The three-dimensional display as claimed in claim 1, wherein the liquid crystal phase modulator comprises an inner half-wave plate disposed inside the liquid crystal phase modulator when the two lenses having two polarized directions perpendicular to each other comprise at least a quarter-wave plate.

7. The three-dimensional display as claimed in claim 1, wherein the liquid crystal phase modulator comprises an outer half-wave plate disposed on an outer surface of the liquid crystal phase modulator when the two lenses having two polarized directions perpendicular to each other comprise at least a quarter-wave plate.

8. The three-dimensional display as claimed in claim 1, wherein the liquid crystal phase modulator comprises at least one of an inner half-wave plate and an outer half-wave plate when the two lenses having two polarized directions perpendicular to each other comprise a quarter-wave plate and a half-wave plate, the inner half-wave plate is disposed inside the liquid crystal phase modulator and the outer half-wave plate is disposed on the outer surface of the liquid crystal phase modulator.

9. The three-dimensional display as claimed in claim 1, wherein the liquid crystal phase modulator is divided into a plurality of modulation areas corresponding to the pixels, and the modulation areas have different phase retardations respectively.

10. A fabricating method of a three-dimensional display, comprising:
    providing a display panel comprising a plurality of pixels arranged in array and a polarizer having a transmission axis, and the display panel is suitable for displaying an image; and
    providing a liquid crystal phase modulator disposed on the display panel and between the polarizer and the glasses, the liquid crystal phase modulator comprising a liquid crystal layer and an alignment layer adjacent to the display panel, wherein an included angle between an alignment direction of the alignment layer and the transmission axis is substantially equal to n×45 degrees, an absolute value of n being an integer, the liquid crystal phase modulator is suitable for providing a phase retardation, the liquid crystal phase modulator adjusting a phase of the image to output an image with three-dimensional information, and the liquid crystal phase modulator comprising no polarizer.

11. A controlling method of a three-dimensional display, adapted for a viewer to see a three-dimensional image through glasses, wherein the glasses having two circular polarized lenses of different polarization properties, and the controlling method comprising:

provising a display panel comprising a plurality of pixels arranged in array and a polarizer disposed between the pixels and the glasses, wherein the polarizer having a transmission axis and the display panel being suitable for displaying an image;

providing a liquid crystal phase modulator disposed between the display panel and the glasses, the liquid crystal phase modulator comprising a liquid crystal layer and an alignment layer adjacent to the display panel, wherein an included angle between an alignment direction of the alignment layer and the transmission axis being substantially equal to n×45 degrees and an absolute value of n being an integer; and driving the liquid crystal phase modulator to provide a phase retardation according to the image displayed by the display panel, the liquid crystal phase modulator adjusting an phase of the image to output an image with three-dimensional information, and the liquid crystal phase modulator comprising no polarizer.

* * * * *